(12) United States Patent
Corcoran, Jr.

(10) Patent No.: US 8,500,936 B2
(45) Date of Patent: Aug. 6, 2013

(54) MULTI-PANEL BLANK WITH PARALLEL PANEL AXES FOR A COLLAPSIBLE FIELD DIRECTOR STRUCTURE

(75) Inventor: William R. Corcoran, Jr., Kennett Square, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 98 days.

(21) Appl. No.: 13/163,011

(22) Filed: Jun. 17, 2011

(65) Prior Publication Data
US 2011/0259503 A1 Oct. 27, 2011

Related U.S. Application Data

(62) Division of application No. 12/263,746, filed on Nov. 3, 2008, now Pat. No. 7,985,462.

(60) Provisional application No. 61/001,859, filed on Nov. 5, 2007, provisional application No. 61/001,845, filed on Nov. 5, 2007, provisional application No. 61/001,863, filed on Nov. 5, 2007.

(51) Int. Cl.
*B32B 38/00* (2006.01)

(52) U.S. Cl.
USPC .............. 156/226; 156/196; 156/66

(58) Field of Classification Search
USPC ........................... 156/66, 196, 226
See application file for complete search history.

(56) References Cited

U.S. PATENT DOCUMENTS

| | | | | | |
|---|---|---|---|---|---|
| 5,242,106 | A | * | 9/1993 | Gulliver | 229/120 |
| 5,900,264 | A | * | 5/1999 | Gics | 426/107 |
| 6,063,415 | A | * | 5/2000 | Walters | 426/107 |
| 2005/0230383 | A1 | * | 10/2005 | Romeo et al. | 219/730 |

* cited by examiner

*Primary Examiner* — Bruce H Hess
*Assistant Examiner* — Christopher Polley

(57) ABSTRACT

A blank for forming a collapsible field director structure comprises nonconductive material sheet having at least three panels thereon, one panel being a master panel and the other two panels being slave panels. Each panel is substantially rectangular in shape and has elongated upper and lower edges and two relatively shorter side edges. Each panel is connected to at least one adjacent panel along an elongated edge. A patch of adhesive is disposed on: the first surface of a first one of the panels; and another patch of adhesive is disposed on: the first surface on one of the other panels; or the second surface of said first one of the panels. The slave panels are each foldable along an elongated edge so that a surface of each slave panel is brought into confronting facial adjacency to and adhered against a surface of the master panel.

3 Claims, 15 Drawing Sheets

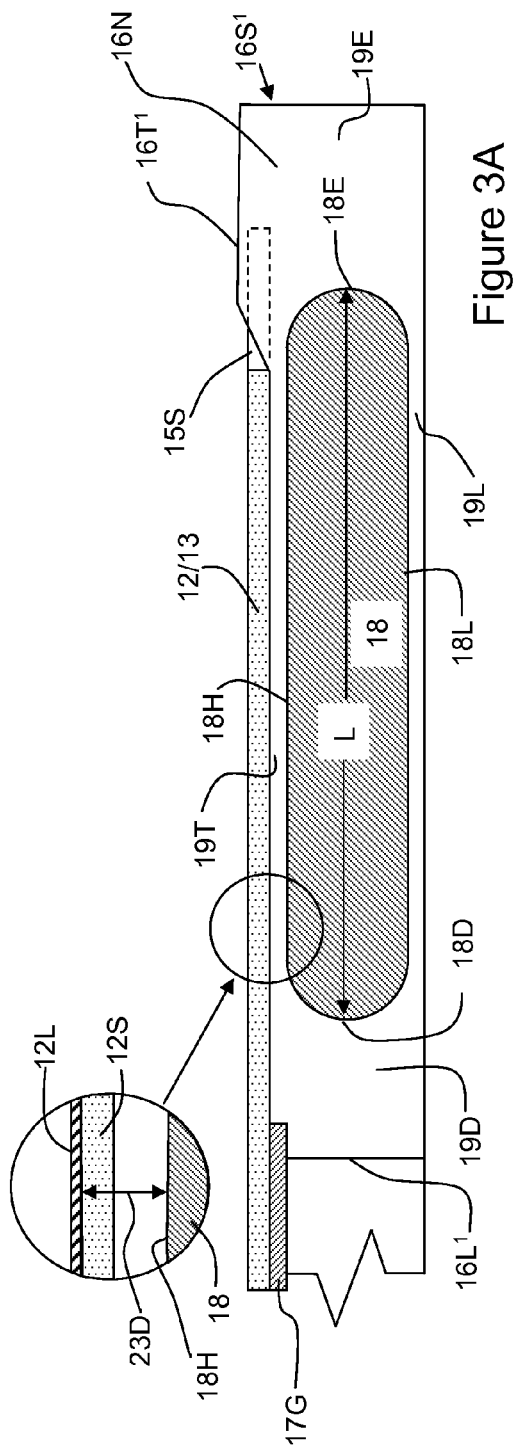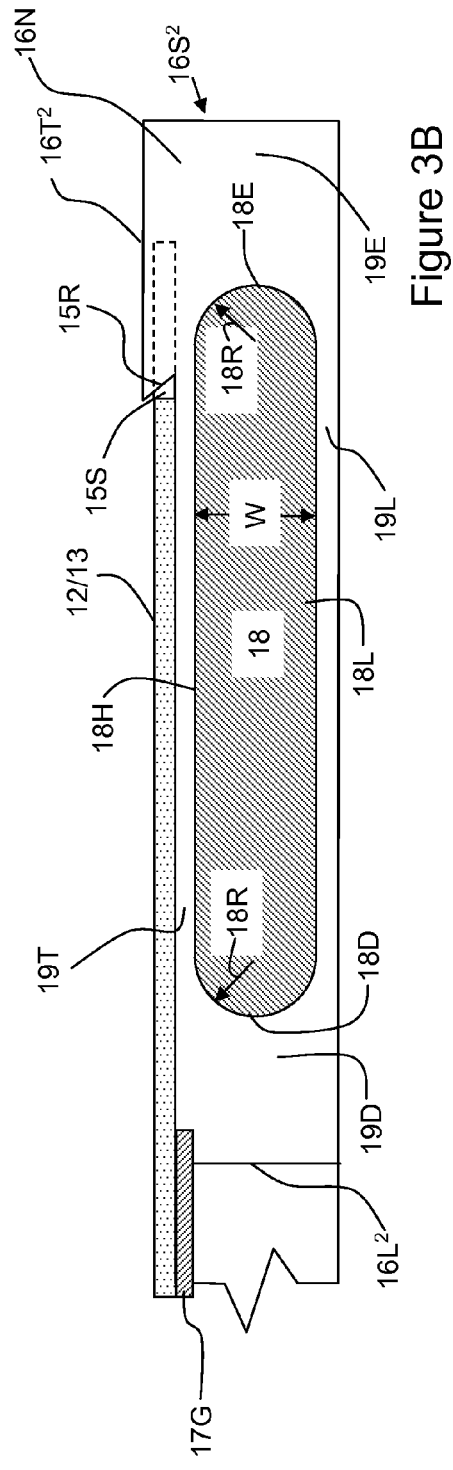
Figure 3A
Figure 3B

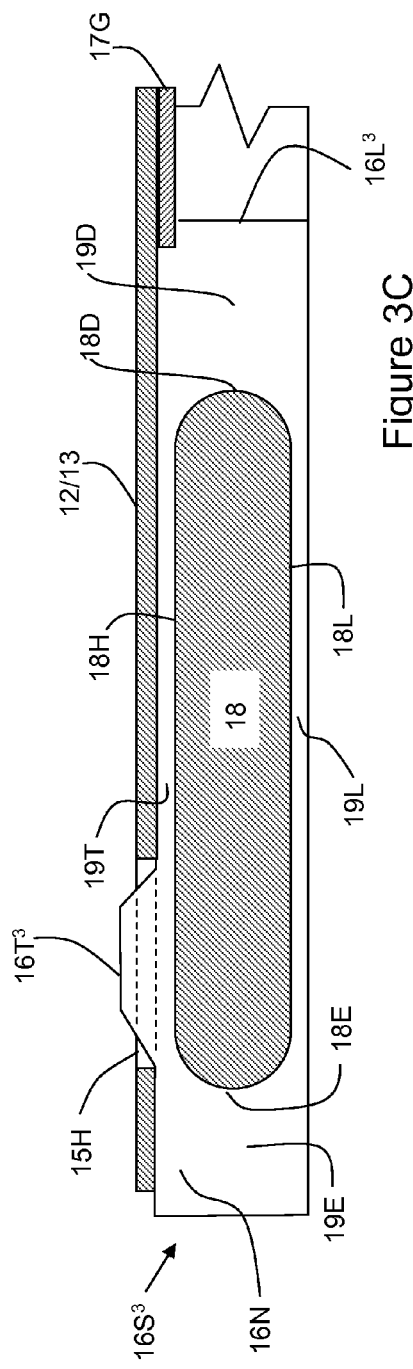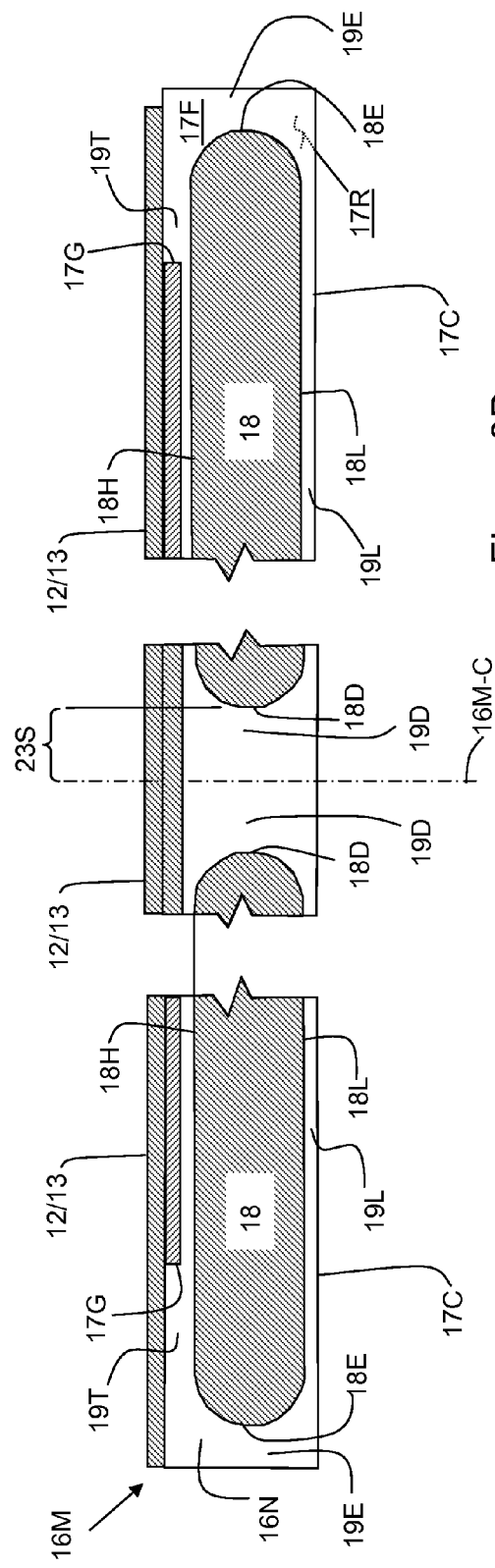

MULTI-PANEL BLANK WITH PARALLEL PANEL AXES FOR A COLLAPSIBLE FIELD DIRECTOR STRUCTURE

This application claims the benefit of priority to the following four (4) U.S. Provisional Applications:
61/001,859, filed Nov. 5, 2007
61/001,846, filed Nov. 5, 2007
61/001,845, filed Nov. 5, 2007
61/001,863, filed Nov. 5, 2007

FIELD OF THE INVENTION

The present invention is directed to a multi-panel blank having parallel panel axes for a collapsible field director structure.

CROSS REFERENCE TO RELATED APPLICATION

Subject matter disclosed herein is disclosed in the following copending application filed contemporaneously herewith and assigned to the assignee of the present invention;
Collapsible Field Director Assembly, filed as Ser. No. 12/263,709.

BACKGROUND OF THE INVENTION

Microwave ovens use electromagnetic energy at frequencies that vibrate molecules within a food product to produce heat. The heat so generated warms or cooks the food. To achieve surface browning and crisping of the food a susceptor may be placed adjacent to the surface of the food. A typical susceptor comprises a lossy metallic layer on a substrate. When exposed to microwave energy the material of the susceptor is heated to a temperature sufficient to cause the food's surface to brown and crisp. It is a common practice to include a susceptor in the packaging of the food product.

Variations in the intensity and the directionality of the electromagnetic field energy often form relatively hot and cold regions within the microware oven. These hot and cold regions cause the food to warm or to cook unevenly. If a microwave susceptor material is present the browning and crisping effect is similarly uneven.

One expedient to counter these uneven effects is the use of a turntable. The turntable rotates a food product along a circular path within the oven. This action exposes the food to a more uniform level of electromagnetic energy. However, the averaging effect produced by the turntable's rotation occurs along circumferential paths within the oven and not along radial paths. Thus, even with the use of the turntable bands of uneven heating within the food are still created.

This effect may be more fully understood from the diagrammatic illustrations of FIGS. 1A and 1B.

FIG. 1A is a plan view of the interior of a microwave oven showing five regions ($H_1$ through $H_5$) of relatively high electric field intensity ("hot regions") and two regions $C_1$ and $C_2$ of relatively low electric field intensity ("cold regions"). A food product F having any arbitrary shape is disposed on a susceptor S which, in turn, is placed on a turntable T. The susceptor S is suggested by the dotted circle while the turntable is represented by the bold solid-line circle. Three representative locations on the surface of the food product F are illustrated by points J, K, and L. The points J, K, and L are respectively located at radial positions $P_1$, $P_2$ and $P_3$ of the turntable T. As the turntable T rotates each point follows a circular path through the oven, as indicated by the circular dashed lines.

As may be appreciated from FIG. 1A during one full revolution point J passes through a single hot region $H_1$. During the same revolution the point K passes through a single smaller hot region $H_5$ and one cold region $C_1$. The point L experiences three hot regions $H_2$, $H_3$ and $H_4$ during the same rotation. Rotation of the turntable through one complete revolution thus exposes each of the points J, K, and L to a different total amount of electromagnetic energy. The difference in energy exposure at each of the three points during one full rotation is illustrated by the plot of FIG. 1B.

Owing to the number of hot regions encountered and cold regions avoided points J and L experience considerably more energy exposure than Point K. If the region of the food product in the vicinity of the path of point J is deemed fully cooked, then the region of the food product in the vicinity of the path of point L is likely to be overcooked or excessively browned (if a susceptor is present). On the other hand the region of the food product in the vicinity of the path of point K is likely to be undercooked.

Another expedient to counter the undesirable presence of hot and cold regions is to employ a field director structure, either alone or in combination with a susceptor.

The field director structure includes one or more vanes, each having an electrically conductive portion on a support of paperboard or other nonconductive material. The electrically conductive portions of the field director structure mitigate the effects of regions of relatively high and low electric field intensity within a microwave oven by redirecting and relocating these regions so that food warms and cooks more uniformly. When used with a susceptor the field director structure causes the food to brown more uniformly.

When an electrically conductive portion of a vane of the field director is placed in the vicinity of either an inherently lossy food product or a lossy layer of a susceptor attenuation of certain components of the electric field occurs. This attenuation effect is most pronounced when the distance between the electrically conductive portion of the field director and the lossy element (either the lossy food product or the lossy layer of the susceptor) is less than one-quarter (0.25) wavelength. For a typical microwave oven this distance is about three centimeters (3 cm). This effect is utilized by the prior art field director structure to redirect and relocate the regions of relatively high electric field intensity within a microwave oven.

FIG. 1C is a stylized plan view, generally similar to FIG. 1A, illustrating the effect of a vane V of a field director as it is carried by a turntable T in the direction of rotation shown by the arrow. The vane V is shown in outline form and its thickness is exaggerated for clarity of explanation.

Consider the situation at angular Position 1, where the vane V first encounters the hot region $H_2$. Due to one corollary of Faraday's Law of Electromagnetism only an electric field vector having an attenuated intensity is permitted to exist in the segment of the hot region $H_2$ overlaid by the vane V. However, even though only an attenuated field is permitted to exist the energy content of the electric field cannot merely disappear. Instead, the attenuating action in the region adjacent to the conductive portion of the vane manifests itself by causing the electric field energy to relocate from its original location A to a displaced location A'. This energy relocation is illustrated by the displacement arrow D.

As the rotational sweep carries the vane V to angular Position 2 a similar result obtains. The attenuating action of the vane V again permits only an attenuated field to exist in the region adjacent to the conductive portion of the vane. The energy in the electric field originally located at location B displaces to location B', as suggested by the displacement arrow D'.

The overall effect of the point-by-point attenuating action produced by the passage of the vane V through the region $H_2$ is the relocation of that region $H_2$ to the position indicated by the reference character $H_2'$. Similar energy relocations and redirections occur as the vane V sweeps through all of the regions $H_1$ through $H_5$ (FIG. 1A) of relatively high electric field intensity.

FIG. 1D is a plot showing total energy exposure for one full rotation of the turntable at each discrete point J, K and L. The corresponding waveform of the plot of FIG. 1B is superimposed in FIG. 1D as a dotted line thereover.

It is clear from FIG. 1D that the presence of a field director results in a total energy exposure that is substantially uniform. As a result warming and cooking of a food product placed on the field director will be improved over the situation extant in the earlier prior art. Similarly, the use of a field director in conjunction with a susceptor improves uniformity of browning of a food product.

If inadvertently used in an "unloaded" microwave oven (i.e., an oven without a food product or other article being present) problems of overheating of the susceptor assembly and overheating and arcing of the field director have been observed. These problems are prevented when the conductive portions are appropriately configured and positioned on the vanes of the field director.

In view of the beneficial results provided by a field director, it is believed desirable to include a field director structure or a susceptor assembly that includes a field director within the packaging of the food product or other article. However, inclusion of the field director structure or susceptor assembly should be effected in a manner that does not increase unduly the volume occupied by the packaging.

Accordingly, in view of the foregoing it is believed advantageous to provide a field director structure or a susceptor assembly including a field director structure amenable for inclusion with a food product or other article in a way that minimizes the amount of packaging material needed for the package and which minimizes both the transport and display volume occupied by the package.

SUMMARY OF THE INVENTION

The present invention is directed to a method of forming a collapsible field director structure from a blank comprising a sheet of nonconductive material having at least three panels thereon. One of the panels is a master panel and the other two panels are slave panels, the master panel and each slave panel having a front surface and a rear surface, the master panel and both slave panels each having at least two spaced-apart conductive regions thereon.

Each panel is substantially rectangular in shape, has elongated edges, and is connected to at least one adjacent panel along an elongated edge. The master panel has a line of articulation formed thereon extending generally parallel to the upper edge thereof and subdividing the master panel into a mounting flange portion and a remainder portion. The remainder portion has a fold line formed thereon subdividing the remainder portion into a spacer section and a conductor section.

The method comprises the steps of: folding the spacer and conductor sections with respect to each other to dispose the surface of the sections in confronting facial relationship; adhering the confronting surfaces of the spacer and conductor sections to each other thereby to define a double-thickness conductor flap having a front surface and a rear surface; folding the double-thickness conductor flap and one of the slave panels with respect to each other to dispose the front surface of the conductor flap in confronting facial adjacency to the rear surface of said one slave panel; folding the conductor flap of the conductor flap and the other slave panel with respect to each other to dispose the rear surface of the conductor flap and the rear surface of said other slave panel in confronting facial adjacency; adhering the front surface of the conductor flap to the rear surface of said one slave panel; and adhering the rear surface of the conductor flap to the rear surface of said other slave panel.

The mounting flange may be attached to a planar support element to form a collapsible field director structure. A susceptor assembly having a collapsible field director structure may alternatively be formed by attaching the mounting flange of the master vane of the field director structure to a planar susceptor instead of a planar support element.

BRIEF DESCRIPTION OF THE DRAWINGS

The invention will be more fully understood from the following detailed description, taken in connection with the accompanying drawings, which form a part of this application and in which:

FIGS. 3A, 3B and 3C are sectional views taken along respective section lines 3A-3A, 3B-3B and 3C-3C of FIG. 2 illustrating alternative forms of locking tabs for a field director structure in accordance with the present invention;

FIG. 3D is a sectional view taken along section lines 3D-3D of FIG. 2 illustrating a master vane for a field director structure in accordance with the present invention;

DETAILED DESCRIPTION OF THE INVENTION

Figure 1A:
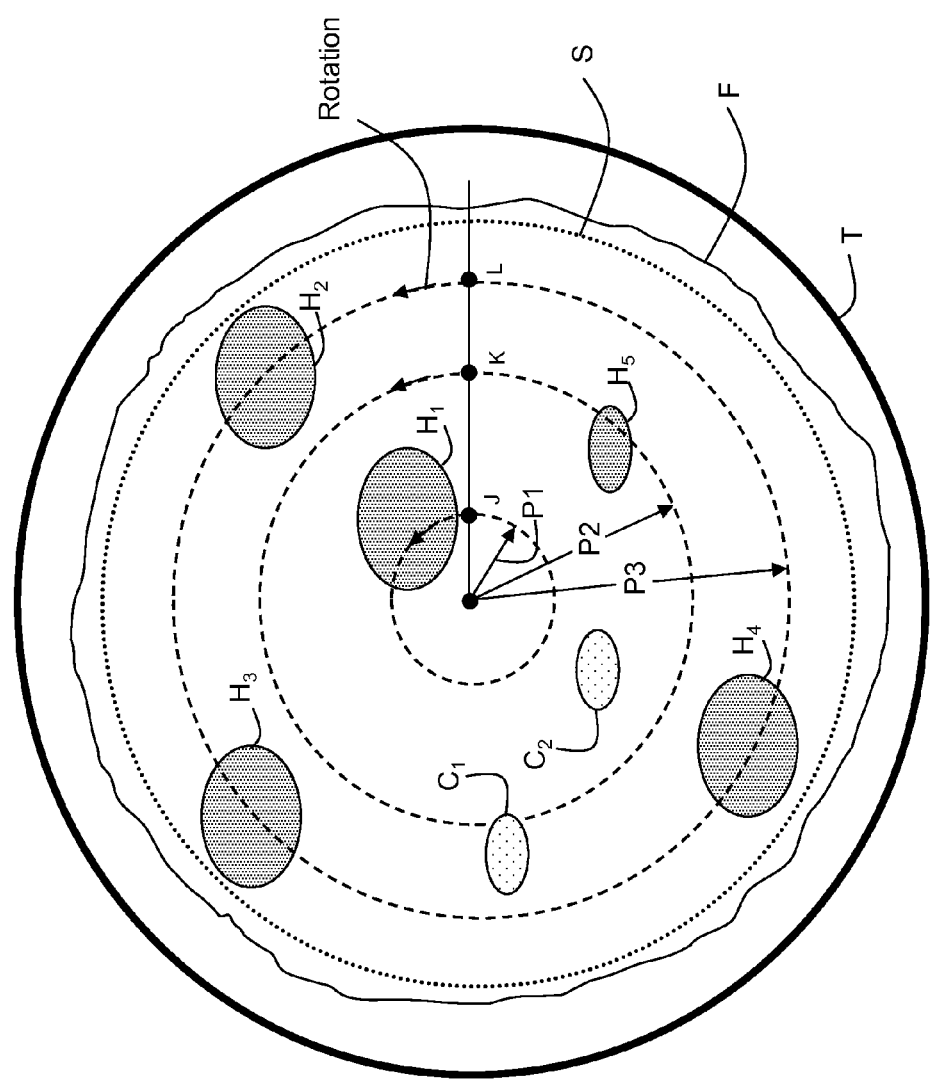
FIG. 1A is a plan view showing regions of differing electric field intensity within a microwave oven and showing the paths followed by three discrete points J, K, and L located at respective radial positions $P_1$, $P_2$ and $P_3$ on a turntable.
Figure 1B:
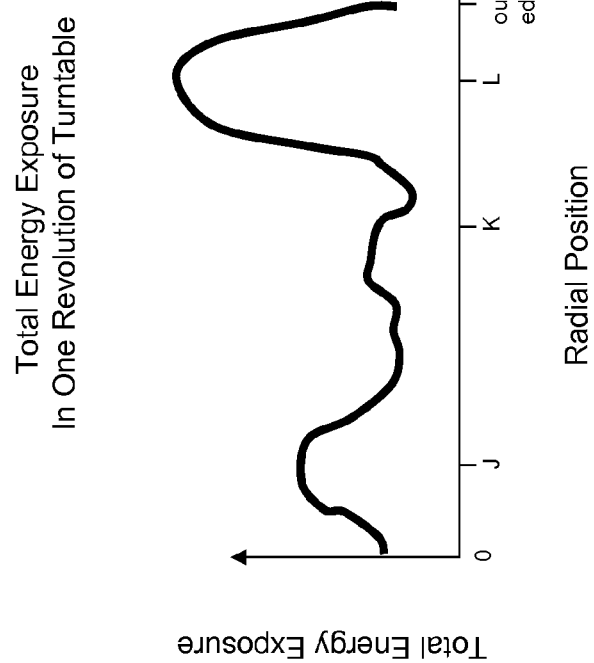
FIG. 1B is a plot showing total energy exposure for one full rotation of the turntable at each of the discrete points identified in FIG. 1A.
Figure 1C:
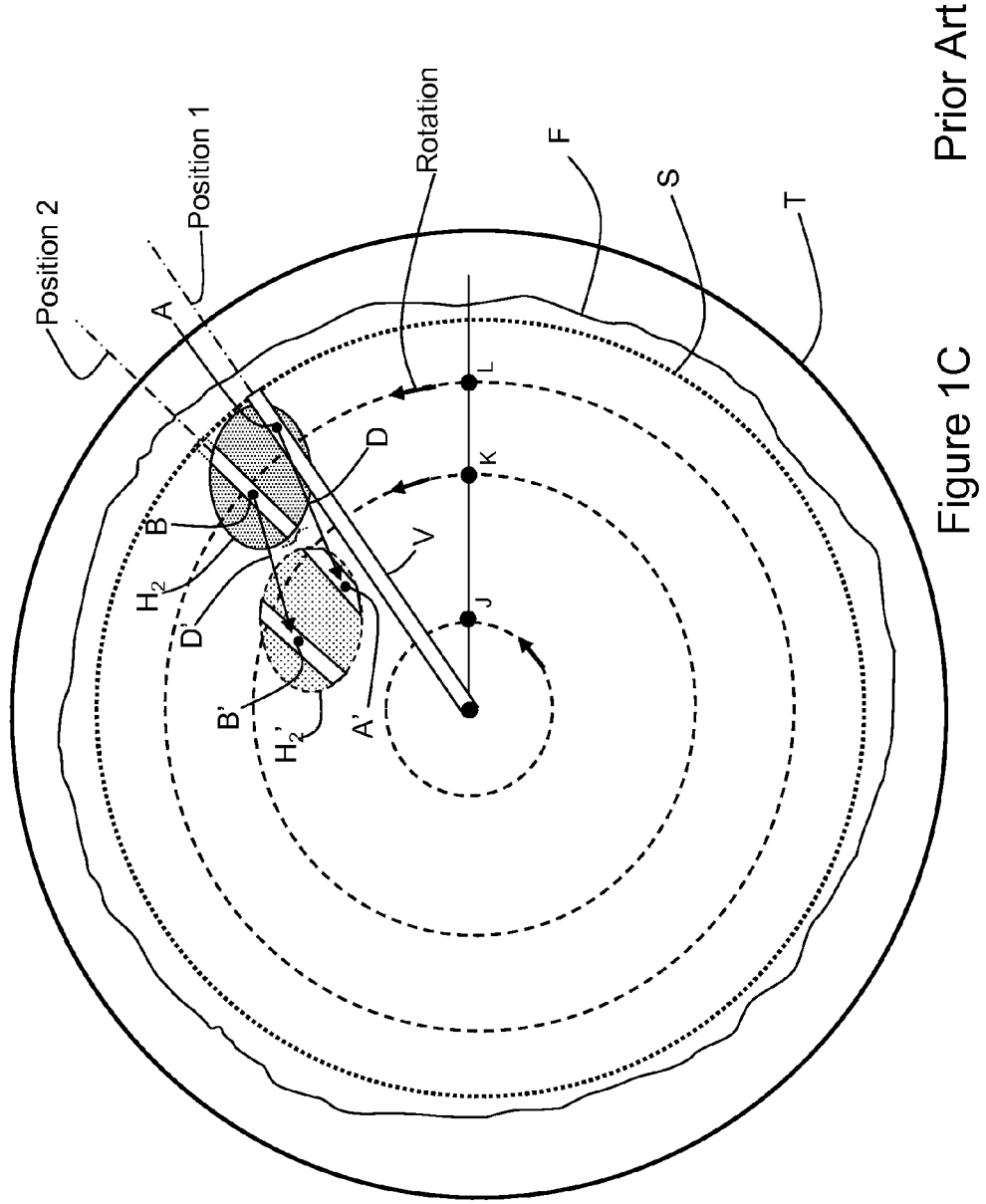
FIG. 1C is a plan view, generally similar to FIG. 1A, showing the effect of the field director structure upon regions of high electric field intensity and again showing the paths followed by three discrete points J, K, and L located at respective radial positions $P_1$, $P_2$ and $P_3$ on a turntable.
Figure 1D:
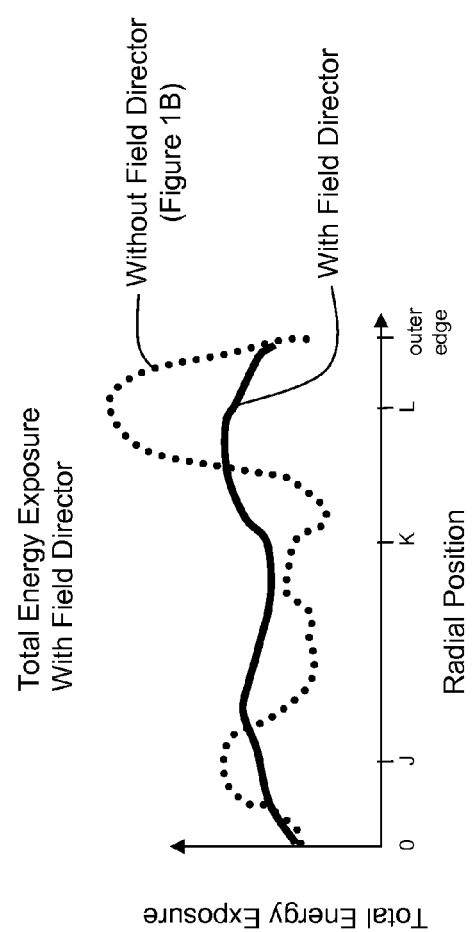
FIG. 1D is a plot, similar to FIG. 1B, showing total energy exposure for one full rotation of the turntable at each discrete point, with the waveform of FIG. 1B superimposed for ease of comparison.

Throughout the following detailed description similar reference characters refer to similar elements in all figures of the drawings.

Figure 2:
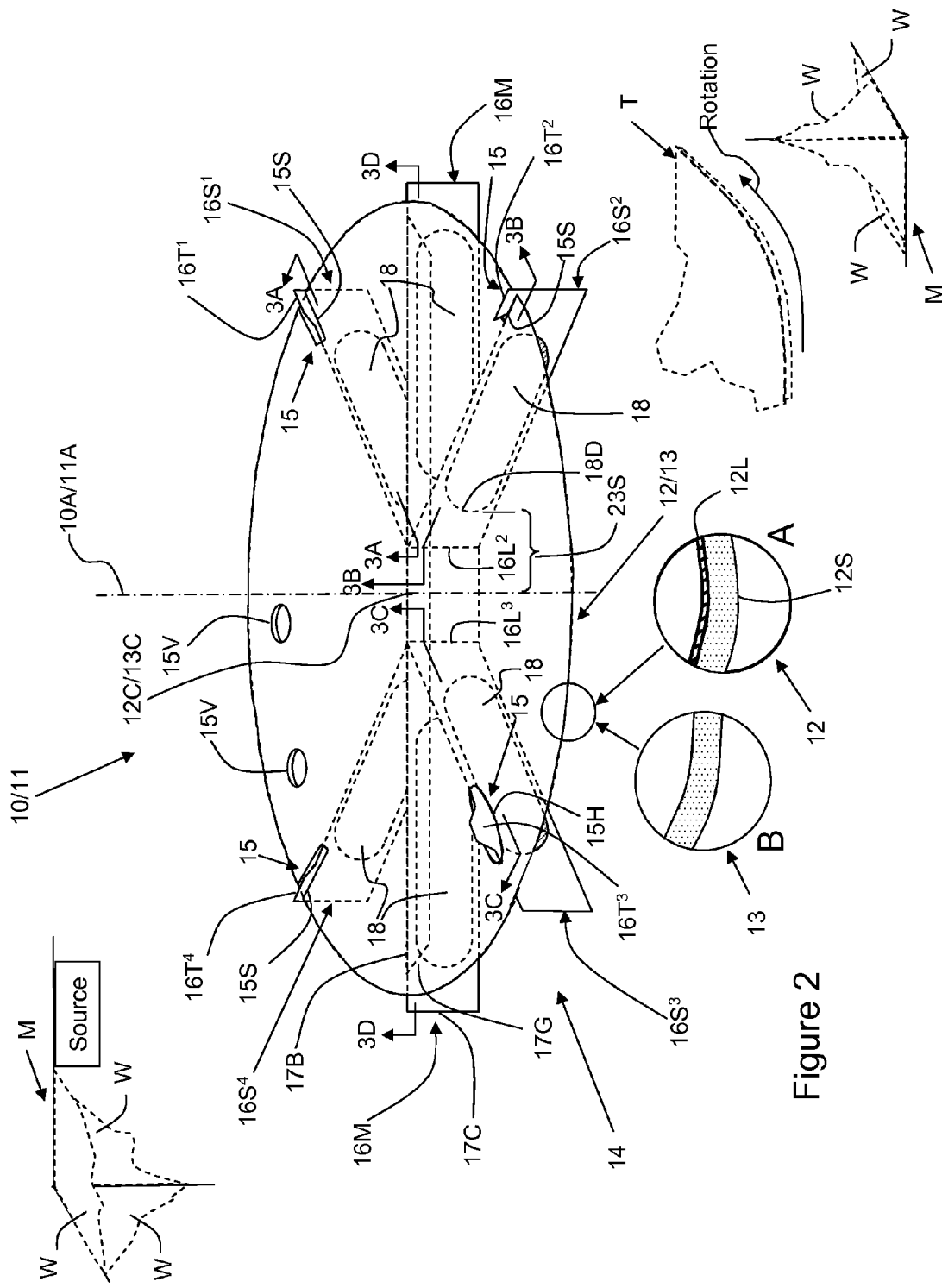
FIG. 2 is a perspective view illustrating a susceptor assembly/field director assembly incorporating a field director structure in accordance with the present invention with the field director structure in the deployed state.

FIG. 2 is a pictorial perspective view illustrating either a susceptor assembly generally indicated by the reference character 10 or a field director assembly generally indicated by the reference character 11. Each assembly includes a collapsible field director structure generally indicated by the reference character 14 in accordance with the present invention. An assembly 10/11 incorporating the field director structure 14 is useful in heating a food product or other article in a microwave oven M.

The microwave oven M is suggested only in outline form in FIG. 2. A Source in the oven M produces an electromagnetic wave having a predetermined wavelength. A typical oven operates at a frequency of 2450 MHz producing an electromagnetic wave having a wavelength on the order of twelve (12) centimeters (about 4.7 inches). The walls W of the oven M impose boundary conditions that cause the distribution of electromagnetic field energy within the volume of the oven to vary. This generates a standing wave energy pattern within the volume of the oven. In the same manner as is explained in the Background of this application the field director structure 14 is useful for redirecting and relocating regions of higher and lower electric field intensity of the standing wave pattern within the volume of the oven. When used in conjunction with a turntable T (suggested in outline form in FIG. 2) the positions of the redirected and relocated regions change continuously, to effect more uniform tempering, thawing and cooking of a food product or other article. Tempering is the warming of a food product, typically meat, from a sub-zero temperature (e.g., −40° F.) to about freezing (32° F.). To effect browning or crisping of a food product or other article a susceptor assembly having a conventional susceptor S is used in conjunction with the field director structure 14.

As will be developed the field director structure 14 in accordance with the invention is convertible from a collapsed to a deployed state. In the deployed state (shown in FIG. 2) the field director structure 14 occupies a self-supported disposition oriented generally orthogonal with respect to a planar element of the assembly 10/11. In this disposition the field director structure 14 is able to perform its function of redirecting and relocating the regions of higher or lower field intensity. In the collapsed state (shown in FIG. 4) the field director structure 14 occupies a generally planar disposition which facilitates the inclusion of an assembly 10/11 incorporating the field director structure 14 within the packaging of the food product or other article.

As noted each of the susceptor assembly 10 and the field director assembly 11 includes a generally planar element. In the case of a susceptor assembly 10 the planar element takes the form of a generally planar susceptor 12 (FIG. 2). For a field director assembly 11 the generally planar element takes the form of a nonconductive support member 13. The susceptor 12 and the support member 13 each have a geometric center indicated by the respective reference character 12C/13C. A respective reference axis 10A/11A for the assembly 10/11 extends through the respective geometric center 12C/13C of its planar element 12/13.

Whether implemented in the form of a susceptor 12 or a support member 13 the planar element has an array of various openings 15 disposed therethrough. As will be more fully explained herein some of the openings 15 may be configured as open-ended slots 15S (see also FIGS. 3A, 3B, 4 and 5) that interrupt the periphery of the planar element 12/13 or as variously shaped holes 15H (see also FIGS. 3C, 4) that are surrounded by the material of the planar element. A suitable number of appropriately positioned vent openings 15V (suggested in FIG. 2 with a fuller array shown in FIG. 4) may also be provided through the susceptor 12 or the support member 13 to allow the escape of moisture from a food product or other article.

The susceptor 12 of the susceptor assembly 10, illustrated in detail A of FIG. 2, comprises a electrically nonconductive substrate 12S having an electrically lossy layer 12L thereon. It should be noted that in the drawings electrically nonconductive material is illustrated by stipled shading and electrically conductive material is illustrated by continuous diagonal shading.

The layer 12L is typically a thin coating of vacuum deposited aluminum. The planar susceptor 12 shown in the Figures is generally circular in outline although it may exhibit any predetermined convenient size and shape consistent with the food product or other article (not shown) to be warmed, cooked or browned within the oven M. In the Figures the field director structure 14 is disposed under the susceptor 12 although it should be appreciated that these relative positions may be reversed. Whatever the respective relative positions of the field director structure 14 and the planar susceptor 12 the food product or other article is typically placed in contact with the susceptor 12.

The substrate 12S of the susceptor 12 may be made from any of a variety of materials conventionally used for this purpose, such as cardboard, paperboard, fiber glass, other composites, or a polymeric material such as polyethylene terephlate, heat stabilized polyethylene terephlate, polyethylene ester ketone, polyethylene naphthalate, cellophane, polyimides, polyetherimides, polyesterimides, polyarylates, polyamides, polyolefins, polyaramids or polycyclohexylenedimethylene terephthalate. The substrate 12S may be omitted if the electrically lossy layer 12L is self-supporting.

In the case of a field director assembly 11 the nonconductive support member 13, illustrated in detail B of FIG. 2, is made from one of the same nonconductive materials used to form the substrate 12S. The support member 13 may also take any convenient size and shape. The support member 13 defines a useful platform upon which a separate susceptor (e.g., a plate or sleeve as typically supplied with a food product) may be placed.

The field director structure 14 includes a master vane 16M and at least two slave vanes generally indicated by the reference character 16S. In general, any convenient number of slave vanes 1, 2, 3 ... N may be used, depending upon the size of assembly 10/11. In the Figures the field director 14 includes four slave vanes $16S^1$, $16S^2$, $16S^3$ and $16S^4$. The master vane 16M and each slave vane 16S has a first, front, surface generally indicated by the reference character "F" and a second, rear, surface generally indicated by the reference character "R" appended as a suffix to the corresponding reference numeral (see FIG. 5).

As will be discussed in connection with the particular embodiment shown in FIGS. 6A through 6D the master vane 16M and pairs of slave vanes 16S are each formed from generally rectangular shaped panels fabricated from a non-conductive substrate 16N (FIGS. 3A through 3D). The preferred material suitable for the panel substrate is a paperboard available from International Paper as Grade Code 1355, 0.017/180# Fortress Uncoated Cup Stock. However, any suitably stiff, embossable, electrical nonconductive material may be used for the vane substrate. One of the same nonconductive substrate materials as mentioned above for the susceptor may be used as the substrate for the panels that form the vanes. The substrate 16N may have a fire retardant composition applied thereto.

The master vane 16M and each slave vane 16S have at least one (but may have more) electrically conductive region(s) 18. An electrically conductive region 18 may be formed as a thin coating of vacuum deposited aluminum or as a foil adhered to the vane's surface. If a foil is used it is desirable to fold the foil to produce at least double-thickness about its periphery.

As perhaps best shown in FIGS. 3A through 3D each electrically conductive region 18 on each vane 16M, 16S has a first (inner) end 18D, a second (outer) end 18E, a top edge 18H and a bottom edge 18L. The inner end 18D of a conductive region 18 is that end disposed closer to the geometric center 12C/13C of the planar element of the assembly 10/11 or the geometric center 16M-C of the master vane 16M (see FIG. 3D). The electrically conductive region 18 on each vane is sized such that the nonconductive substrate 16N of the vane is exposed about the perimeter of each electrically conductive region 18. The exposed substrate defines a top border 19T, a lower border 19L, a radially inner border 19D and a radially outer border 19E.

The longest distance between the first and second ends 18D and 18E defines a predetermined length dimension L (FIG. 3A) for each conductive region 18. The shortest distance between the top edge 18H and the bottom edge 18L defines a predetermined width dimension W (FIG. 3B) for each conductive region 18.

The width dimension W of the electrically conductive region 18 of a vane should be about 0.1 to about 0.5 times the wavelength generated in the oven. The length dimension L of the electrically conductive region 18 of a vane should be at least about 0.25 times the wavelength of the electromagnetic energy generated in the oven. A length dimension L about twice the wavelength of the electromagnetic energy generated in the oven defines a practical upper limit.

Preferably each corner of each electrically conductive region 18 of each vane is rounded at a radius dimension 18R (FIG. 3B). The radius dimension 18R may be up to and including one-half of the width dimension W of the conductive region 18 (i.e., $18R \leq 0.5\,W$).

The conductive region 18 of any vane 16M, 16S may be covered with an electrically nonconductive material such as a dielectric tape or a nonconductive polymeric spray coating (not shown). Suitable spray coatings include a polyacrylic or a polytetrafluoroethylene spray coating.

As best seen in FIG. 3D the master vane 16M is a relatively elongated member (as compared to a slave vane 16S) having a conductor flap 17C and a mounting flange 17G. The geometric center of the master vane 16M is indicated by the reference character 16M-C. As is explained more fully hereinafter the conductor flap 17C of the master vane 16M may have a double-thickness of substrate material. The double-thickness is indicated in the depiction of the master vane in FIG. 5 by the detail C.

Figure 5:
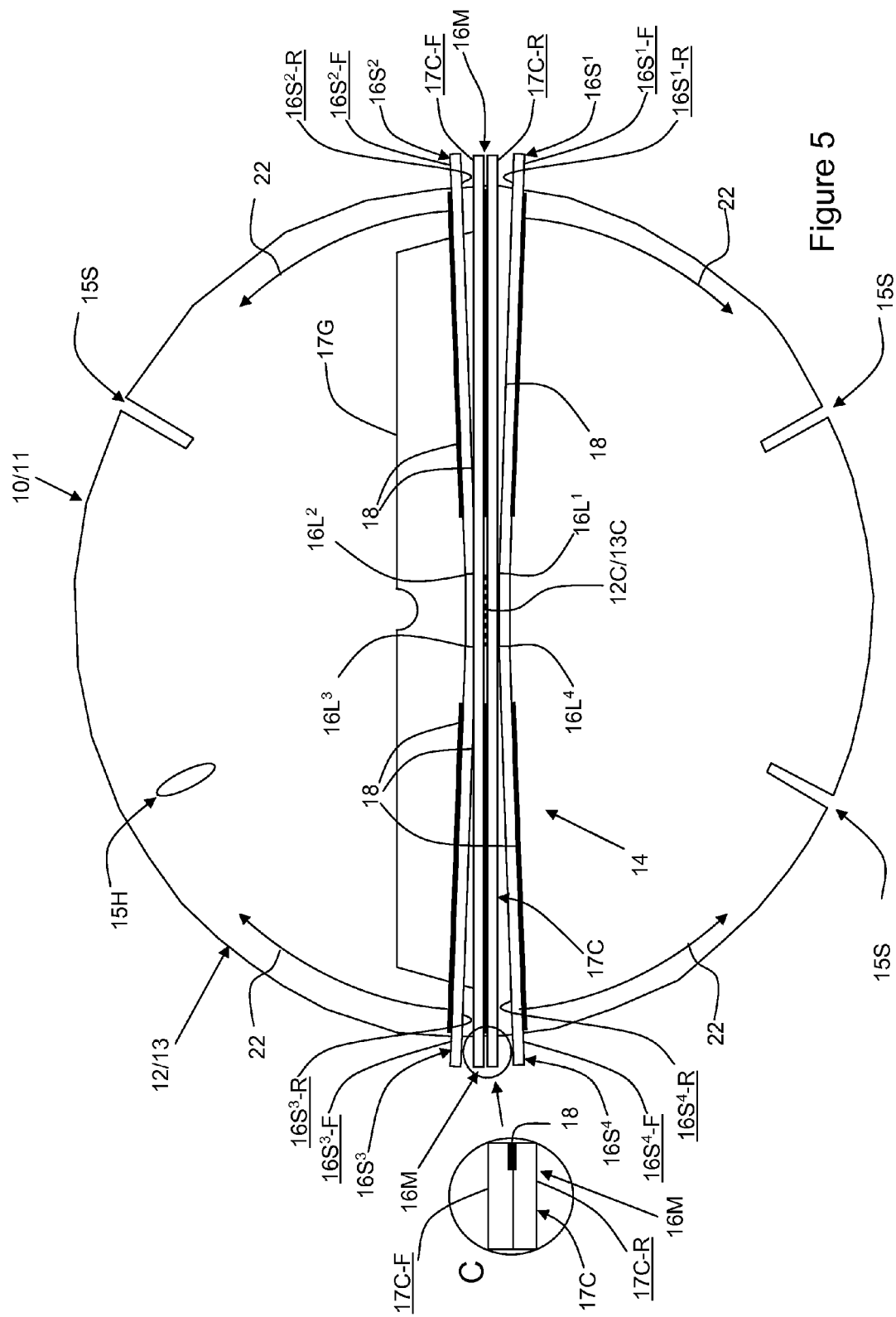
FIG. 5 is a plan view of the underside of the susceptor assembly/field director assembly of FIG. 2 illustrating the field director structure in a disposition intermediate the collapsed and deployed states in which the master vane is articulated with respect to its flange and to the susceptor/support member but before the slave vanes are displaced from the master vane and engaged with the susceptor/support member.

Two non-contiguous electrically conductive regions 18 are provided on the conductor flap 17C of the master vane (FIGS. 2, 3D). The conductive regions 18 may be provided on either the front surface 17F of the conductor flap 17C (as illustrated in FIG. 3D) or the rear surface 17R (FIG. 3D) of the flap 17C, as is convenient. When the conductor flap 17C of the master vane 16M has a double-thickness of substrate material, the conductive regions 18 may alternatively be sandwiched therebetween (FIG. 5).

The conductive regions 18 may also be provided on either the front surface F or the rear surface R of each slave vanes $16S^1$, $16S^2$, $16S^3$ and $16S^4$, as may be convenient. In FIGS. 3A-3D a single conductive region 18 is shown on the front surface of each slave vane 16.

The flange 17G defines the link by which the master vane 16M is connected to the undersurface of either the substrate 12S of the susceptor 12 or to the planar support member 13.

Figure 4:
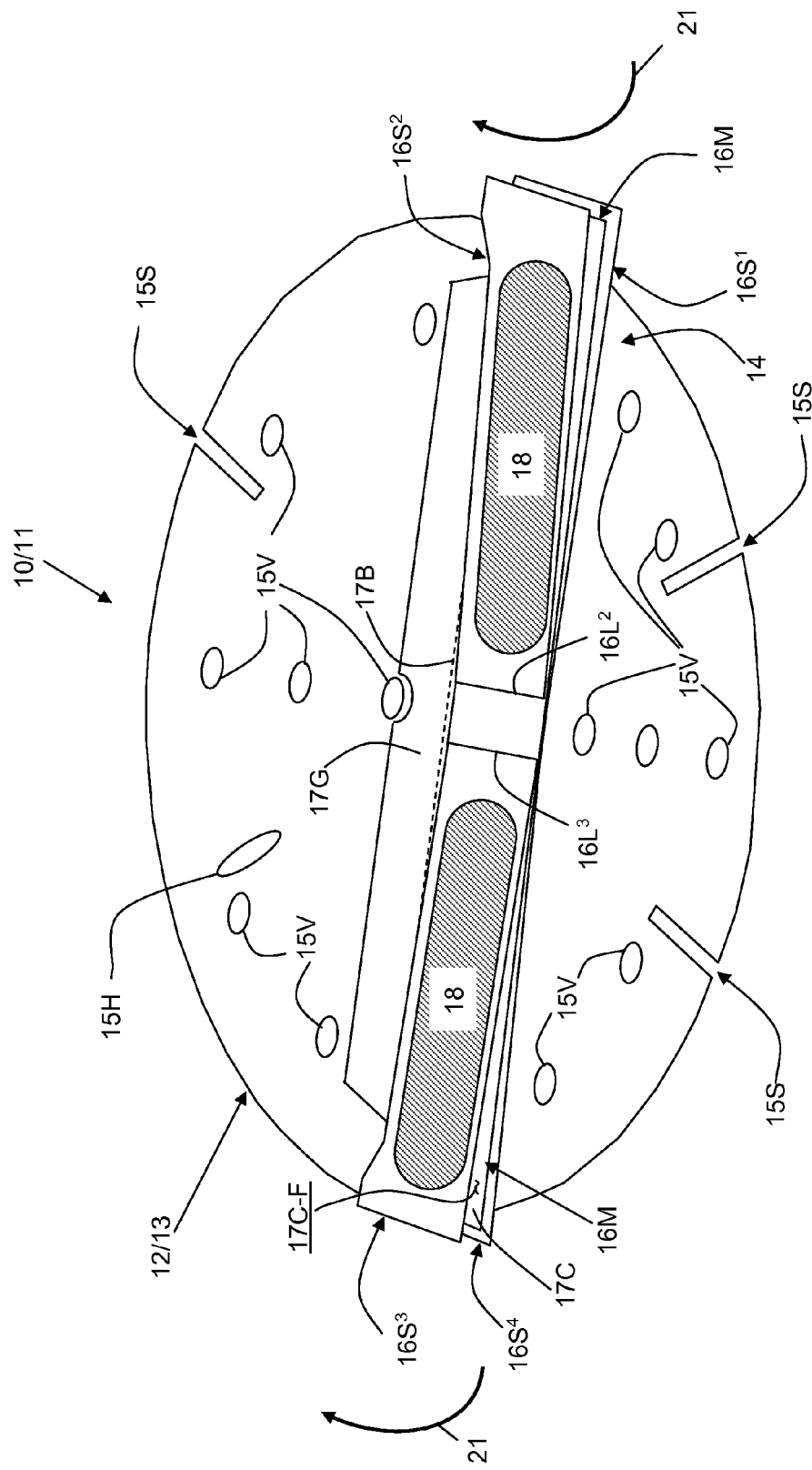
FIG. 4 is a perspective view of the underside of the susceptor assembly/field director assembly of FIG. 2 illustrating the field director structure in its collapsed state wherein the vanes are folded together so that the field director structure occupies a generally planar disposition.

The mounting flange 17G is separated from the conductor flap 17C of the master vane 16M by a line of articulation 17B (FIGS. 2 and 4). The mounting flange 17G is secured such that the line of articulation 17B extends generally along a diametrical dimension of the susceptor 12 or the planar support member 13. Due to the presence of the line of articulation 17B the conductor flap 17C of the master vane 16M is articulably movable with respect to either the susceptor 12 or the support 13, as is apparent from FIGS. 4 and 5.

Each slave vane $16S^1$, $16S^2$, $16S^3$ and $16S^4$ is connected (in a manner to be described) to the master vane 16M. If pairs of slave vanes are formed on panels a panel carrying the slave vanes $16S^1$, $16S^4$ is connected to the rear surface 17C-R of the conductor flap 17C of the master vane 16M. Similarly, a panel carrying the slave vanes $16S^2$, $16S^3$ is connected to the front surface 17C-F of the conductor flap 17C of the master vane 16M.

Each slave vane $16S^1$, $16S^2$, $16S^3$ and $16S^4$ is flexibly connected with respect to the master vane 16M along a respective line of flexure $16L^1$, $16L^2$, $16L^3$ and $16L^4$ (all seen in FIG. 5). The term "flexible", "flexibly" (or similar terms) mean that that a slave vane may be folded with respect to the master vane along its line of flexure. It is not meant to connote that the slave vane necessarily returns to its prior position in a resilient manner.

The distal end of each slave vane $16S^1$, $16S^2$, $16S^3$ and $16S^4$ has a respective locking tab $16T^1$, $16T^2$, $16T^3$ and $16T^4$ thereon. Each locking tab engages a respective opening 15 in the planar element 12/13.

A locking tab may exhibit any convenient shape suitable for engagement into an opening 15. The locking tabs $16T^1$ through $16T^3$ shown in FIGS. 3A through 3C are all generally trapezoidal in shape. Locking tab $16T^1$, $16T^2$ and $16T^4$ are each respectively received within an open-ended slot 15S that interrupts the periphery of the planar element 12/13. The ramped inner edge of the locking tab $16T^2$ on the slave vane $16S^2$ (indicated at reference character 15R in FIG. 3B) engages the planar element 12/13 in a hooked manner. The locking tab $16T^3$ is shown as being received within the hole 15H (FIGS. 2 and 3C).

Conversion From Collapsed to Deployed State As alluded to earlier the field director structure 14 is convertible from a collapsed to a deployed state. The collapsed state of the field director 14 is shown in FIG. 4.

When the field director 14 is in the collapsed state the slave vanes $16S^1$, $16S^4$ fold along their respective lines of flexure $16L^1$, $16L^4$ to bring these vanes into facial engagement against the rear surface 17C-R (best seen in FIG. 5) of the conductor flap 17C of the master vane 16M. Similarly, the slave vanes 16S$^2$, 16S$^3$ fold along their respective lines of flexure 16L$^2$, 16L$^3$ to bring these vanes into facial engagement against the front surface 17C-F of the conductor flap 17C of the master vane 16M. With the slave vanes folded against opposed surfaces of the master vane 16M the conductor flap 17C is able to fold along the line of articulation 17B into generally parallel relationship with the planar element (i.e., either the susceptor 12 or the planar support member 13). Preferably the conductor flap 17C is folded along the line of articulation in a direction that disposes the conductor flap 17C substantially coplanar with the mounting flange 17G. However, the fold may occur in a direction that causes the conductor flap 17C to overlie the mounting flange 17G (with the vanes 16S$^2$, 16S$^3$ sandwiched therebetween).

With the vanes 16M, 16S folded against each other the field director structure 14 as a whole is able to occupy a generally planar disposition against the planar element of the susceptor assembly 10 or the field director assembly 11. In this disposition the susceptor assembly 10 or the field director assembly 11 incorporating the field director structure 14 occupies a minimal volume, thus facilitating its inclusion within a package of a food product or other article.

To transform the field director structure 14 into the deployed state the conductor flap 17C of the master vane 16M (and the slave vanes 16S flexibly connected thereto) articulates with respect to the susceptor 12/support element 13 in the direction of the arrows 21 (FIG. 4). At the completion of the articulated movement the vane 16M of the field director 14 occupies an orientation in which it is substantially perpendicular to its flange 17G and thus, to the attached susceptor 12/support element 13, as the case may be. The plane of each slave vane 16S is oriented substantially perpendicular to the mounting flange of the master vane 16M. The plane of each slave vane intersects with the plane of the master vane along its respective line of flexure. This arrangement is illustrated in FIG. 5.

The slave vanes 16S then flexibly displace with respect to the master vane 16M in the directions of the arrows 22 (FIG. 5) to angularly space the slave vanes from the master vane. Angular displacement continues until the locking tabs 16T on the slave vanes 16S are received in the openings 15 in the susceptor 12/support member 13. The slave vanes 16S each originate from their point of origin along their respective lines of flexure 16L generally in the vicinity of the geometric center 12C/13C and extend generally radially outwardly therefrom toward the receipt of the locking tabs 16T into the openings 15.

As shown in FIG. 2 when deployed the field director structure 14 occupies a self-supported disposition oriented generally orthogonal with respect to a planar element 12/13 of the assembly 10/11. The flexible connection of the slave vanes 16S with the master vane 16M permits the vanes 16M, 16S to cooperate with each other to form the self-supporting field director structure in the deployed state. The receipt of a locking tab 16T in an opening 15 in the planar element 12/13 holds the field director structure 14 in the self-supported disposition.

Owing to the configuration and placement of the conductive regions 18 on the vanes 16M, 16S when the field director 14 is deployed:

(1) the top edge 18H of each conductive region 18 of each vane 16M, 16S is spaced a predetermined distance 23D (FIG. 3A) from the susceptor/support element; and (2) the inner end 18D of each conductive region 18 of each of the vanes 16M, 16S is disposed a predetermined separation distance 23S (FIG. 2) from the geometric center 12C/13C of the planar susceptor 12 or the geometric center 13C of the planar support member 13, as the case may be. If the field director structure 14 is used without a planar susceptor 12 or a planar support member 13 the separation distance 23S is measured from the geometric center 16M-C (FIG. 3D) of the master vane 16M.

The dimension 23D (FIG. 3A) measured in a direction orthogonal to the plane of the susceptor/support element lies in a range from 0.025 to 0.1 times the wavelength of the standing electromagnetic wave produced in the microwave oven in which the susceptor assembly 10 is being used. That is, the dimension 23D should be at least 0.025 times the wavelength. Further, the dimension 23D should be no greater than 0.1 times that wavelength (that is, the dimension 23D≦0.1 times that wavelength).

The separation distance 23S (measured in a direction parallel to the plane of the susceptor 12 or the support member 13) should be at least 0.16 times the wavelength of the standing electromagnetic wave produced in the microwave oven in which the susceptor assembly 10 is being used. For the master vane 16M the distance 23S between an end 18D of a conductive region 18 thereon and the geometric center 12C/13C (or the geometric center 16M-C) is measured along the surface of the master vane 16M (FIG. 3D). Note, however, that for a slave vane 16S the distance 23S is not measured along the surfaces of the slave vane but is measured as the straight line distance between an end 18D of a conductive region 18 on a slave vane 16S and the geometric center 12C/13C (or the geometric center 16M-C). This relationship is indicated in FIG. 2.

The relative placement of the conductive regions with respect to each other and to the susceptor/support member provides beneficial advantages if the field director were to be inadvertently used in an "unloaded" microwave oven (i.e., an oven without a food product or other article being present). When a field director is placed in an unloaded oven and the oven is energized deleterious problems of overheating of the susceptor, and/or overheating of the field director structure, and/or arcing have been observed.

By "overheating of the susceptor" it is meant heating of the lossy susceptor material to the extent that the susceptor substrate burns. "Overheating of the field director structure" means heating of the paperboard support of a vane to the extent that it burns. Such overheating may be caused by either the heat generated by a lossy susceptor material or by arcing. "Arcing" is an electrical discharge occurring when a high intensity electric field exceeds the breakdown threshold of air. Arcing typically occurs in the vicinity of the electrically conductive region(s) of the vanes, particularly along the edges, and especially at any sharp corners. Arcing may cause the substrate of a vane to discolor, to char, or, in the extreme, to ignite and to burn.

It has been found that disposing the first end 18D of the conductive region 18 of each of the vanes at the predetermined separation distance 23S from the geometric center 12C of the planar susceptor 12 mitigates overheating of the susceptor in the vicinity of its center 12C. Additionally or alternatively, overheating has been found to be mitigated by disposing the electrically conductive region 18 of the vane the predetermined close distance 23D from the electrically lossy layer 12L of the planar susceptor 12 (however that spacing is achieved) (FIG. 3A). Further mitigation of overheating of the susceptor may be achieved by the provision of the lower border 19L.

Disposing the electrically conductive region of a vane at the predetermined close distance 23D from the electrically lossy layer 12L of the planar susceptor 12 and rounding the corners of the conductive region 18 with the radius 18R have also been shown to mitigate arcing.

Disposing the first end 18D of the conductive region 18 of each of the vanes at the predetermined separation distance 23S from the geometric center 12C/13C of the planar element or from the geometric center 16M-C of the master vane 16M also mitigates arcing between vanes in this vicinity.

If the conductive region 18 of any of the vanes is covered with the electrically nonconductive material, such a covering material mitigates arcing at corners of the conductive region of the vane whether the corners are squared or rounded. Alternatively or additionally, if the conductive region of a vane is implemented using a foil with folded edges the increased thickness of the perimeter of the conductive region also mitigates arcing.

-o-0-o-

Figure 6A:
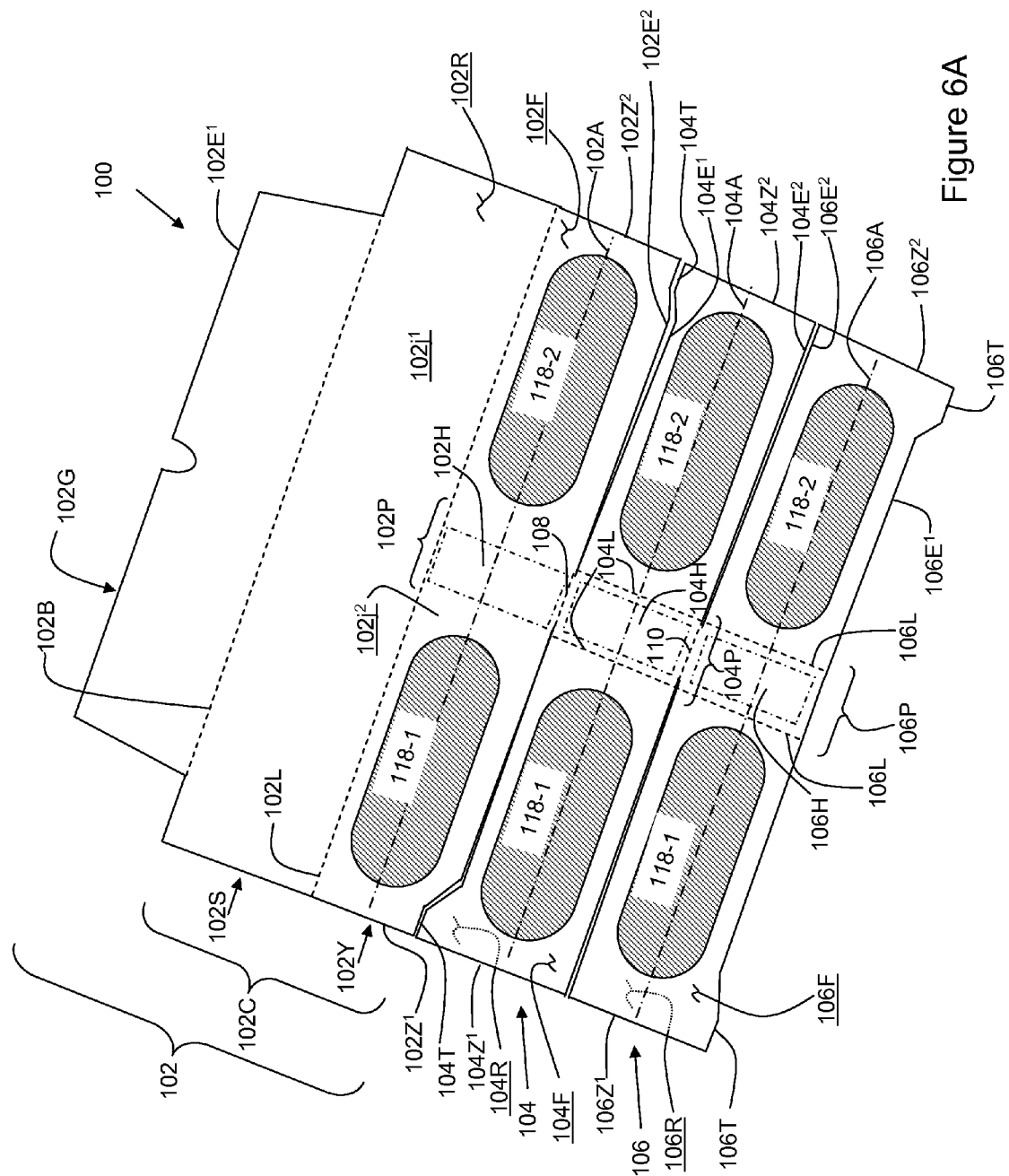
FIG. 6A is a view of a multi-panel sheet blank with parallel panel axes for forming a collapsible field director structure of the present invention.

In another aspect the present invention is directed to a multi-panel blank from which a collapsible field director structure 14 (FIG. 2) in accordance with the present invention may be formed. The blank is shown in FIG. 6A and is generally indicated by the reference character 100. In general, the blank 100 includes a nonconductive substrate having at least three panels 102, 104 and 106 defined thereon. The panel 102 defines a master panel and two of the panels 104, 106 define slave panels. The master panel 102 and the slave panels 104, 106 are the precursors of the master vane 16M and slave vanes 16S present in the finished field director structure 14 (FIG. 2).

It should be understood that it lies within the contemplation of the present invention that a given multi-panel sheet having panels arranged in the parallel configuration may contain additional panels beyond those illustrated which, when folded together and suitably adhered, to define additional vane(s).

Each panel 102, 104 and 106 is substantially rectangular in shape and includes a pair of elongated edges indicated by the appended alphabetic suffix "E$^1$" or "E$^2$", and a pair of relatively shorter side edges indicated by the appended alphabetic suffix "Z$^1$" or "Z$^2$". A reference axis indicated by the reference character 102A, 104A, 106A respectively extends through each panel 102, 104, 106. The axes extend in a direction generally parallel to an elongated edge of a panel. The axes 102A, 104A, 106A lie parallel to each other.

Fold lines 108, 110 are disposed between adjacent panels. The fold lines 108, 110 extend generally parallel to an elongated edge of the slave panels (e.g., edges 104E$^1$, 106E$^2$) so that the respective axes 102A, 104A, 106A of the panels 102, 104, 106 are substantially parallel to each other. Each panel is connected to at least one adjacent panel along an elongated edge. It is noted that the fold lines 108, 110 do not extend across the full breadth of the panels to permit the panels to fold in the manner to be described. The panels are foldable relative to each other along the fold lines 108, 110 so that a surface of each slave panel may be brought into confronting facial adjacency to a surface of the master panel where it is held thereagainst by the adhesive.

Each slave panel 104, 106 has a locking tab 104T, 106T disposed at each end of one elongated edge thereof. The tabs are disposed along opposite elongated edges so that, after folding, the tabs 104T, 106T will be positioned adjacent to the planar member 12/13 to engage the openings 15 therein.

It is noted that the number of slave panels in a blank depends upon the number of slave vanes used in the field director structure 14. Thus, in FIG. 6A each blank includes two slave panels 104, 106 from which the four slave vanes 16S$^1$, 16S$^2$, 16S$^3$ and 16S$^4$ (FIG. 2) are formed.

The master panel 102 has a line of articulation 102B formed thereon. The line of articulation 102B extends generally parallel to an elongated edge (e.g., edge 102E$^1$) of the master panel 102. The line of articulation 102B subdivides the master panel 102 into a mounting flange portion 102G and a remainder portion 102C. The line of articulation 102B corresponds to the line of articulation 17B of master vane 16M discussed in connection with FIGS. 2 through 5.

As seen in FIG. 6A a fold line 102L is formed into the remainder portion 102C. The fold line 102L subdivides the remainder portion 102C into a spacer section 102S and a conductor section 102Y. The surfaces of the spacer section 102S and the conductor section 102Y presented for view in FIG. 6A are respectively indicated by reference characters 102j$^1$ and 102j$^2$. Either or both of these surfaces 102j$^1$ and 102j$^2$ may have an adhesive material thereon for a purpose to be described.

Each panel 102, 104 and 106 has a front surface, indicated by the alphabetic suffix "F" appended to the appropriate reference numeral and a rear surface indicated by the appended alphabetic suffix "R".

The respective front and rear surfaces "F", "R" of the panels 104 and 106 will eventually define the respective front surface F and rear surface R of the slave vanes 16S into which these panels are formed.

As will be developed, because a preliminary operation is required to form the conductor flap 17C of the master vane from the blank 100, spaced areas on the rear surface 102R of the panel 102 (FIG. 6A) will eventually define the respective front surface 17F and rear surface 17R (FIG. 3D) of the conductor flap 17C of the master vane 16M. These spaced areas are located on the rear surface of the panel 102 opposite to the surface 102j$^1$ of the spacer section 102S and on the rear surface of the panel 102 opposite to the surface 102j$^2$ of the conductor section 102Y, respectively. In particular the reverse side of the surface 102j$^1$ will eventually define the rear surface 17R of the conductor flap 17C (FIGS. 5, 6D) while the reverse side of the surface 102j$^2$ of the conductor section 102Y will eventually define the front surface 17F of the conductor flap 17C (FIGS. 5, 6D).

The conductor section 102Y of the remainder portion 102C of the master panel 102 and both slave panels 104, 106 each have at least two spaced-apart conductive regions 118-1 and 118-2 thereon. These conductive regions 118-1 and 118-2 are the precursors of the conductive regions 18 disposed on the master vane 16M and the slave vanes 16S as discussed earlier. Although, in principle, the conductive regions may be disposed on either a front surface F, a rear surface R, or both surfaces, of a given panel, it may be more convenient to manufacture a blank by disposing all of its conductive regions on the same surface of a panel.

The region on any panel between the spaced-apart conductive regions 118-1 and 118-2 defines a land portion indicated by the appended alphabetic suffix "P". Flexure lines denoted by an appended alphabetic suffix "L" are scored into one surface of each slave panel between the conductive regions thereon. These flexure lines are the precursors of the flexure lines 16L of the slave vanes 16S.

As will be discussed a patch of an adhesive material is disposed on the first surface of a first one of the three panels. In addition, another patch of adhesive material is disposed on either: the first surface on one of the other panels; or, the second surface of said first panel. In FIG. 6A the locations of the adhesive patches are demarcated by dot-dashed lines and denoted by an appended alphabetic suffix "H". The adhesive must be disposed between the flexure lines L of the slave panels to insure that the slave panels may be properly deployed to form the structure shown in FIG. 2.

The adhesive may be applied in any convenient form. Any adhesive material commonly used for microwave susceptors may be used for each or both of the patches. Suitable adhesives include that manufactured by Henkel Adhesives, Elgin, Ill., and sold as type 45-6120 or those manufactured by Basic Adhesives, Inc., Brooklyn, N.Y. and sold as types BR-3885 or BR-4736.

Any one of the following combinations of surfaces provides the minimum essential adhesive placements to implement these requirements for the construction of a field director structure from the parallel blank 100:

- a) the front surface 102F and the rear surface 102R of the master panel 102; or
- b) the front surface 102F of the master panel 102 and the rear surface 106R of the slave panel 106; or
- c) the rear surface 104R of the slave panel 104 and the rear surface 106R of the slave panel 106; or
- d) the rear surface 102R of the master panel 102 and the rear surface 104R of the slave panel 104.

Other combinations of surfaces may be used for the placements of adhesives. However, these combinations result in extra adhesive being disposed on confronting surfaces when a slave panel is brought into confronting facial adjacency to a surface of the master panel. In the following listed combinations, the surfaces having the additional adhesive are indicated by the asterisk (*). These additional combinations are:

- e) the front surface 102F* and the rear surface 102R of the master panel 102 and the rear surface 104R* of the slave panel 104; or
- f) the front surface 102F and the rear surface 102R* of the master panel 102 and the rear surface 106R* of the slave panel 106; or
- g) the rear surface 102R* and the rear surface 104R of the slave 104 and the rear surface 106R* of the slave panel 106; or
- h) the front surface 102F* and the rear surface 104R of the slave 104 and the rear surface 106R* of the slave panel 106; or
- i) the front surface 102F* and the rear surface 102R* of the of the master panel 102, the rear surface 104R* of the slave panel 104 and the rear surface 106R* of the slave panel 106.

Figure 6B:
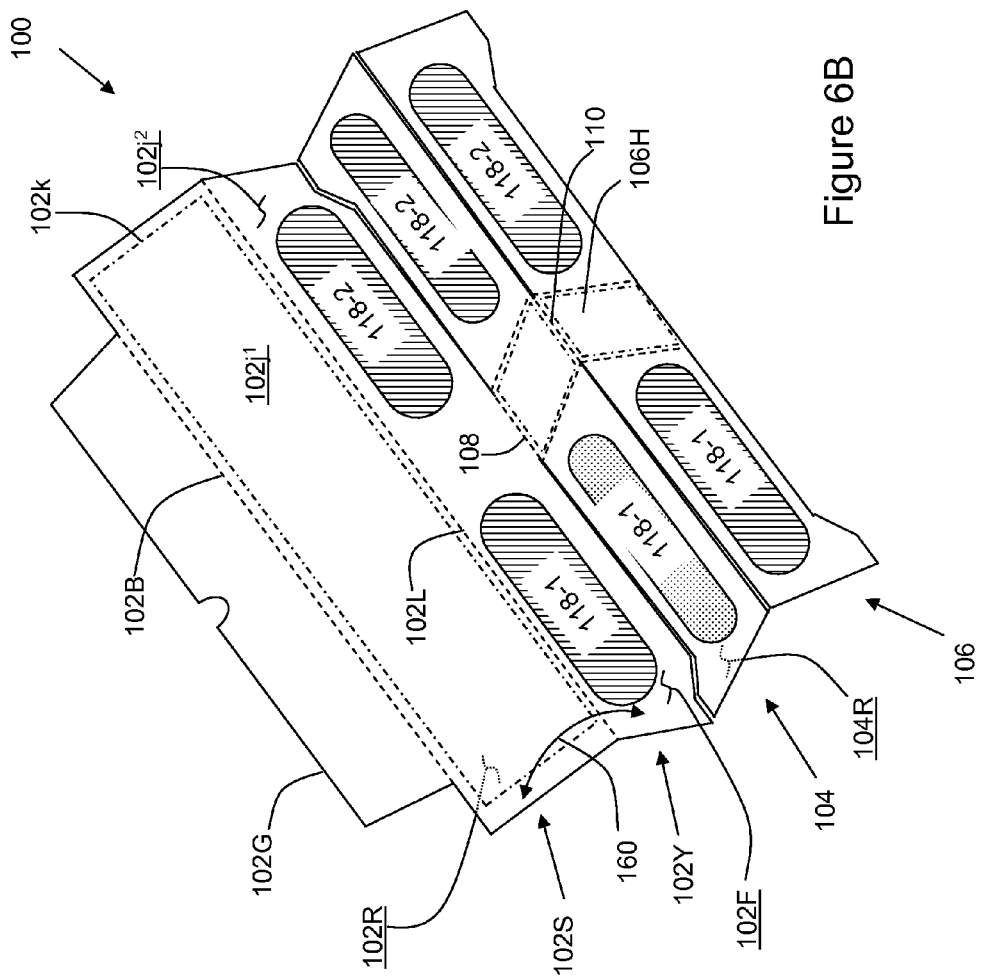
FIGS. 6B and 6C are perspective views taken along view lines directed from the bottom front of the sheet blank of FIG. 6A illustrating the various steps in forming a collapsible field director structure of the present invention from that blank.
Figure 6C:
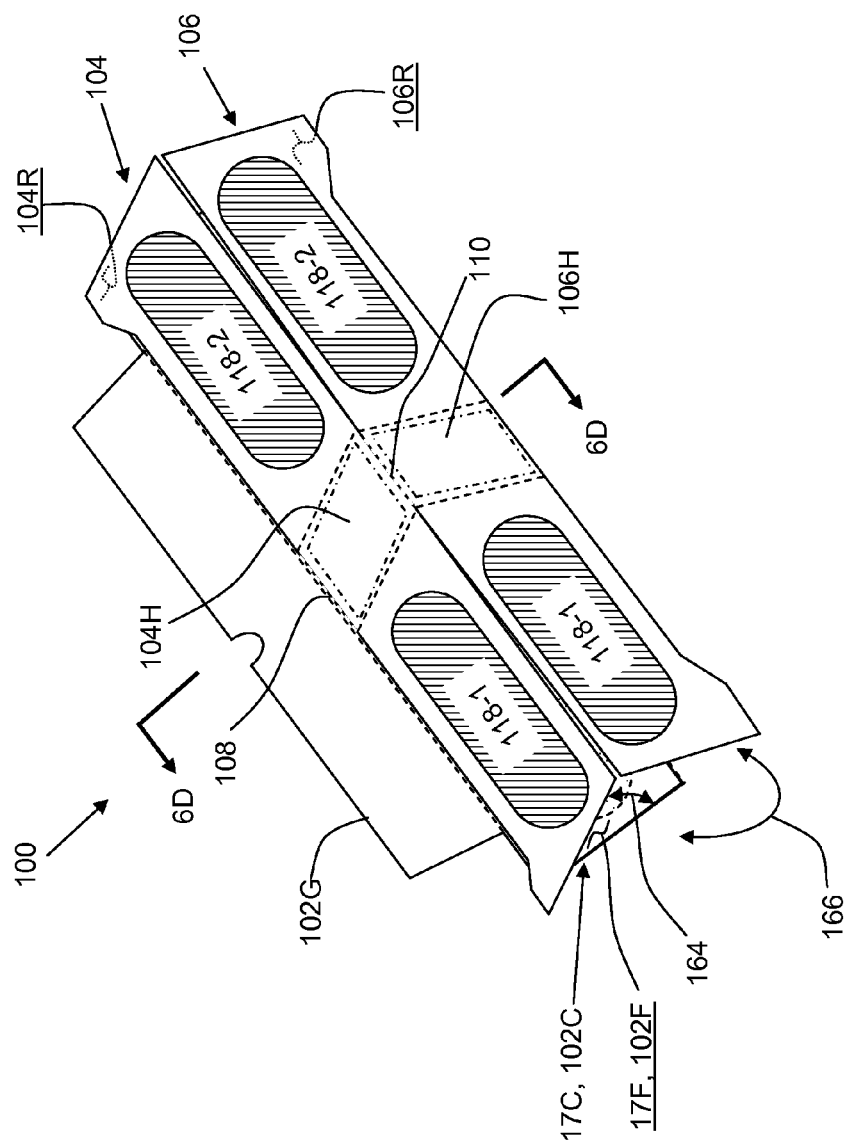
Figure 6D:
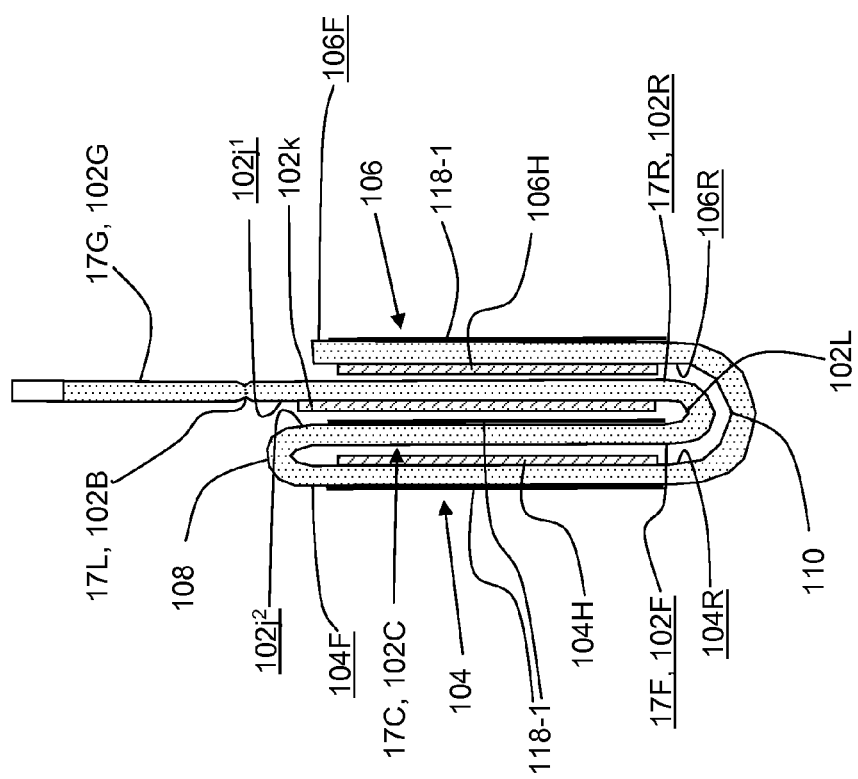
FIG. 6D is a sectional view taken along section lines 6D-6D in FIG. 6C after completion of the steps of FIGS. 6B and 6C showing a collapsible field director structure of the present invention as formed from that blank.

The method by which a blank 100 configured in the parallel configuration may be fashioned into a field director structure 14 may be understood from the sequence of drawings shown in FIGS. 6B through 6D. The views presented in FIGS. 6B and 6C are also as seen looking upwardly and rearwardly from a viewpoint located below the bottom front of the parallel blank of FIG. 6A.

The preliminary operation mentioned above that forms the conductor flap 17C from the remainder portion 102C of the master panel 102 is shown in FIG. 6B. An adhesive material 102k (shown by the dot-dashed outline) is disposed over the majority of the surface $102j^1$ of the spacer section 102S. The same adhesive material as used for the other patches may be used here. The surfaces $102j^1$ and $102j^2$ of the master panel are folded along the fold line 102L into confronting facial adjacency. This fold is indicated by the arrow 160.

Once brought into facial adjacency the surfaces $102j^1$ and $102j^2$ are adhered together to form the conductor flap that corresponds to the flap 17C (FIGS. 3D, 6D). The conductor flap 17C thus has a double-thickness of substrate material, as also depicted by the detail view C in the drawing FIG. 5. Opposed surfaces of the double-thickness conductor flap 17C define the front surface 17F and the rear surface 17R of the master vane 17, as is apparent from examination of FIG. 6D.

Next (FIG. 6C), the now-formed master vane 17 and the slave panel 104 are folded relative to each other along the fold line 108 to bring the front surface 17F of the conductor flap 17C of the now-formed master vane 17 and the rear surface 104R of the slave panel 104 into confronting facial adjacency. This folding action is indicated by the reference arrow 164.

In the next step (also seen in FIG. 6C) the slave panel 106 is folded along the fold line 110 to bring its rear surface 106R into confronting facial adjacency with the rear surface 17R on the conductor flap 17C of the now-formed master vane 17 (FIGS. 6B and 6D). The folding action is indicated in FIG. 6C by the reference arrow 166.

The fully folded collapsible field director structure is shown in the sectional view of FIG. 6D. The surfaces 17F/104R and the surfaces 17R/106R are adhered together by the appropriately positioned adhesive materials 104H and 106H (shown as respectively disposed on the rear surfaces of the panels 104 and 106) (minimum alternative c) as described above. The mounting flange of the field director structure so completed may be attached to a planar support element, as will be discussed. Alternatively, a susceptor structure having a collapsible field director structure may be formed by attaching the mounting flange to a planar susceptor instead of a planar support element, as will also be discussed.

It should be appreciated that the steps of the method may be performed in alternative order or may be performed simultaneously. For instance the folding and adhering steps may performed in a different sequence, e.g., the slave panel 104 may be folded against the conductor section 102Y and adhered thereto, then the conductor section 102Y may be folded against the spacer section 102S and adhered thereto and finally the slave panel 106 may be folded against the spacer section 102S and adhered thereto.

-o-0-o-

Figure 7A:
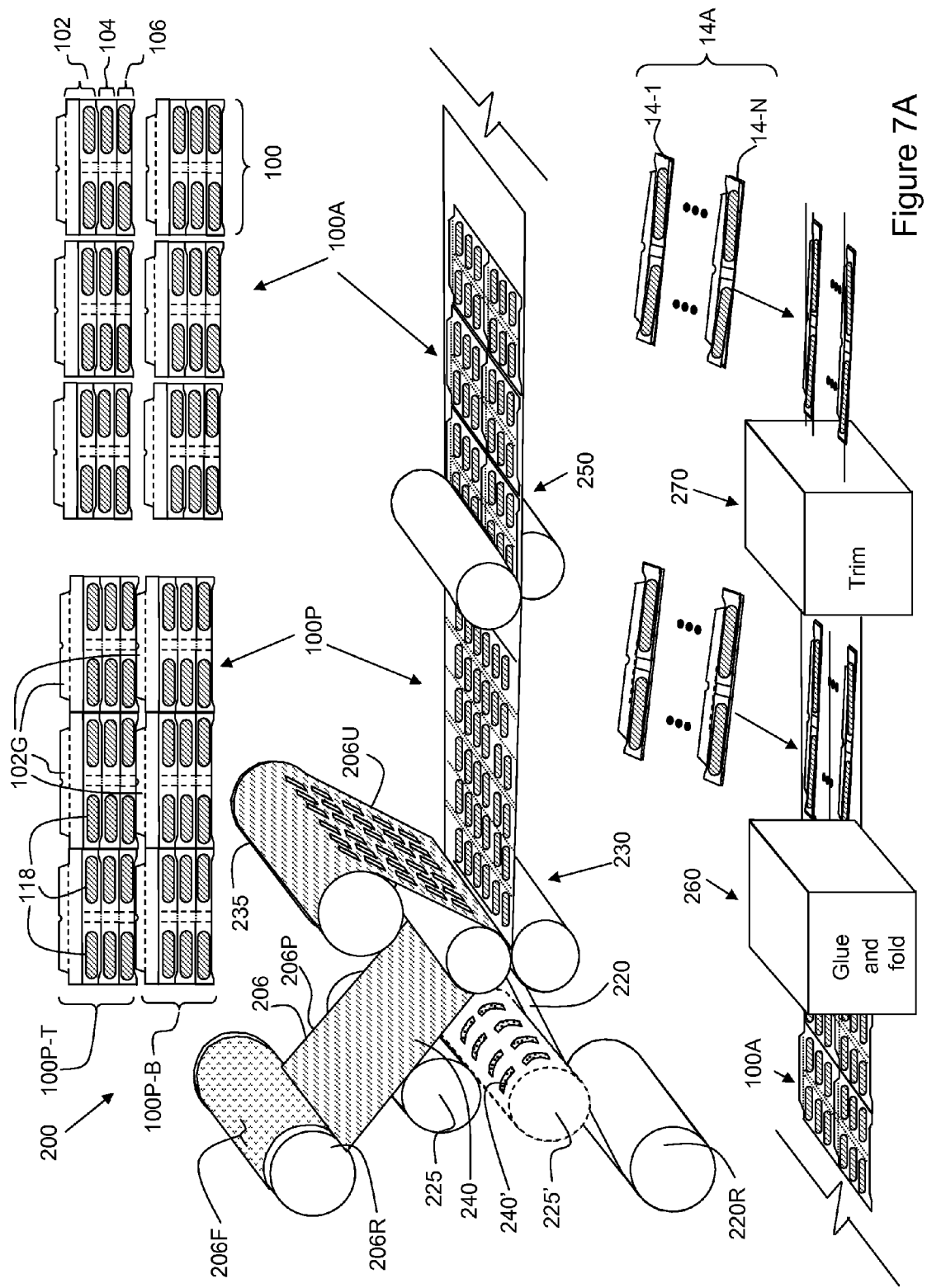
FIGS. 7A and 7B are diagrammatic views of a manufacturing process for forming a collapsible field director structure using the blank of FIG. 6A and for forming a susceptor assembly therefrom.
Figure 7B:
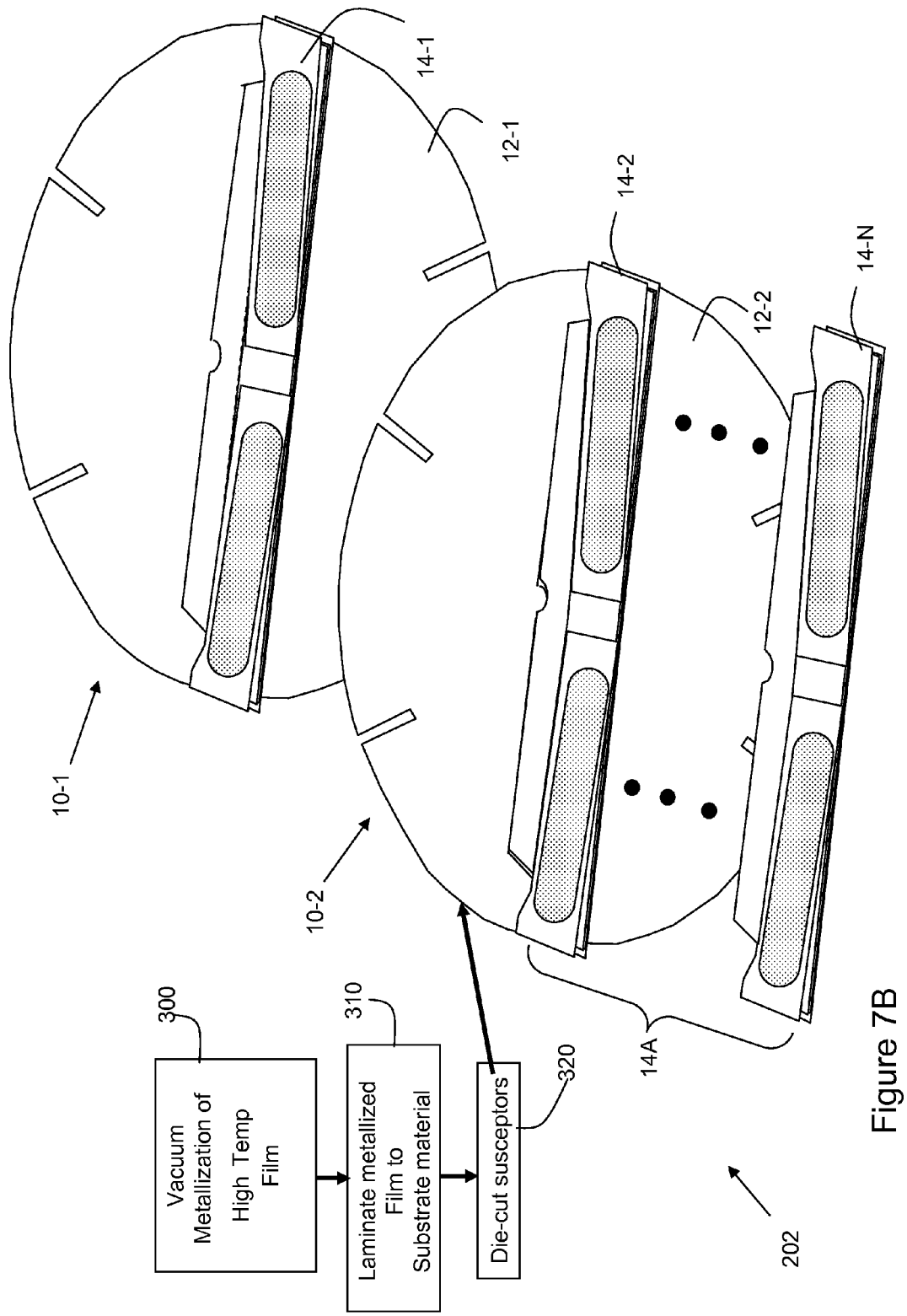

Manufacturing Process Description FIG. 7A is a diagrammatic view of a manufacturing process generally indicated by the reference character 200 for forming multiple collapsible field director structures 14 from an array 100P of preform blanks 100 each configured as shown in FIG. 6A. In FIG. 7A the array 100P is shown to have a top and a bottom row of blanks 100P-T, 100P-B. FIG. 7B is a diagrammatic view of a manufacturing process generally indicated by the reference character 202 for forming multiple susceptor assemblies 10 each having a susceptor 12 and a collapsible field director structure 14.

The individual sheet blanks in the array 100P may be arranged in any desired orientation. For example, although the blanks are shown in FIG. 7A with the flanges 102G of the blanks in both rows 100P-T, 100P-B oriented toward a first elongated edge of the array, to conserve conductive material the orientation of the flanges 102G of the blanks in the bottom row 100P-B may be reversed so that the flanges 102G of the blanks in bottom row 100P-B are oriented toward the second elongated edge of the array. Alternatively, the blanks may be rotated so that the flanges are oriented orthogonal to the elongated edges of the array.

To form the field director structures 14 a roll 206R of a foil-film laminate 206 and a roll 220R of substrate material 220 (e.g., paperboard) are supplied to a laminating/die cutting apparatus 230. The foil-film laminate 206 is comprised of a metal foil 206F and a polymeric film 206P. An adhesive 240 is applied in a predetermined pattern to the foil side 206F of the foil-film laminate 206 by a roll assembly 225. Alternatively, the adhesive 240' may be applied in a predetermined pattern to the substrate material 220 by a roll assembly 225'. The pattern of adhesive 240 (or 240') is applied to the foil 206F (or the substrate web 220) in those areas eventually to be occupied by the conductive regions 118 on the panels 102, 104, 106.

The laminating/die cutting apparatus 230 adheres the foil 206F to the substrate material 220, die cuts the foil/film laminate 206 along the perimeters of the conductive regions 118, and strips away the un-adhered foil/film laminate 206U. The un-adhered foil/film laminate 206U is collected by a roll 235.

The laminating/die cutting apparatus 230 scores the paperboard to define the fold lines 108, 110, the lines of articulation 102B and the flexure lines 104L, 106L (FIG. 6A). The laminating/die cutting apparatus 230 also die cuts the substrate along perimeter lines to form the preform array 100P. For clarity an enlarged plan view of this array 100P of sheet blank preforms is shown at the top left region of FIG. 7A.

The array 100P of sheet blank preforms is fed to a die cutting apparatus 250 which die cuts the array 100P along perimeter lines of the individual sheet blanks 100 to form an array 100A of individual sheet blanks 100. An enlarged plan view of this array 100A of sheet blanks is also shown at the top right region of FIG. 7A.

The array 100A of individual sheet blanks 100 is then fed to a gluing and folding apparatus 260. The gluing and folding apparatus 260 applies adhesive in the patches 102H, 104H and/or 106H, as previously described in conjunction with FIGS. 6A through 6D.

Each individual sheet blank 100 is folded and glued together in the manner as shown in FIGS. 6B through 6D. The sheet blanks 100 may then be trimmed by a trimming apparatus 270 to form an array 14A of field director structures 14-1, 14-2, . . . 14-N. The field director structures 14 in the array 14A may be still attached to each other at several corner points to facilitate handling.

FIG. 7B shows the forming of the susceptor assemblies 10. A series of susceptors 12 is created and adhered to the field director structures 14 to form the susceptor assemblies 10.

The formation of the susceptor 12 is shown in the block diagram at the left of the FIG. 7B. As indicated in block 300 a lossy layer 12L (FIG. 2) is formed by vacuum metallizing a polymeric film [e.g., heat-stabilized polyethylene tereptha-late (PET)]. The lossy layer 12L thus formed is laminated to a suitable substrate 12S to form a laminate structure as shown at block 310. This laminate structure is then die-cut (block 320) in the desired shape to form a series of susceptors 12 (two susceptors 12-1 and 12-2 are shown).

Individual die-cut susceptors 12 and the individual ones, e.g., 14-1, 14-2, of the array 14A of field director structures 14 are adhered together to form a susceptor assembly 10. The individual field director structures 14 are separated from the array 14A and each glued to a corresponding susceptor 12 in the area of the flange 17G (see also FIGS. 4 and 5). In FIG. 7B one susceptor assembly 10-1 is shown as already assembled. A second susceptor assembly 10-2 is being assembled by adhering the flange of a second field director structure 14-2 to a second susceptor 12-2.

Each completed susceptor assembly 10 with its field director structure 14 in the collapsed state is suitable for inclusion in the package of a food product or other article.

If a field director assembly 11 (not having a susceptor) is to be formed, each field director structure 14 may be attached to a planar support element 13.

Method of Use When the package containing the food product or other article is opened by the consumer, the sus-ceptor assembly 10 (or field director assembly 11) with the field director structure 14 in its collapsed state is removed from the package. In the collapsed state the vanes 16 of the field director structure 14 are folded flat against the susceptor 12 (or planar support element 13) as seen in FIG. 4.

To deploy the field director structure 14 the master vane 16M is articulably moved away from the planar susceptor 12 along the line of articulation 17B on the flange 17G so that the vanes 16M, 16S are oriented orthogonally to the plane of the susceptor 12 (or planar support element 13) and to the flange 17G (FIG. 5). The slave vanes 16S are then flexibly displaced in an angular direction from the master vane 16M (arrows 22, FIG. 5) along the respective lines of flexure 16L until the locking tabs 16T engage the openings 15 in the planar susceptor 12 (or planar support element 13) (see FIG. 2).

When deployed the field director structure 14 occupies a self-supported disposition oriented generally orthogonal with respect to the mounting flange 17G and the susceptor 12 of the assembly 10 (or planar support element 13 of the field director assembly 11).

By virtue of the flexible connection of the slave vanes 16S with the master vane 16M, the vanes 16M, 16S cooperate with each other to form the self-supporting field director structure when deployed. Due to the receipt of a locking tab 16T within an opening 15 in the susceptor 12 (or planar support element 13), the field director structure 14 is held in the self-supported disposition.

The fully deployed assembly 10/11 is then placed in the microwave oven with the susceptor 12 (if used) in contact with the food product or other article for subsequent heating, cooking, or browning. If the oven includes the turntable T (FIG. 2), the fully deployed assembly 10/11 (with the food product or other article thereon) is placed on the turntable.

When energized the oven produces a standing electromagnetic wave having a predetermined wavelength. As explained in connection with FIGS. 1A-1D, in the presence of the standing electromagnetic wave only an attenuated electric field component of the electromagnetic wave exists in a plane tangent to the conductive region of each vane. The attenuation of the electric field component of the electromagnetic wave results in enhancement of the component of the electric field substantially orthogonal to the conductive region of each vane.

The attenuating action manifests itself by causing the electric field energy to relocate on the planar susceptor 12. The presence of an assembly 10/11 having the field director structure 14 thus results in a total energy exposure that is substantially uniform. As a result, warming, cooking and browning of a food product or other article placed on the assembly 10/11 will be improved over the situation extant in the prior art.

Those skilled in the art, having the benefit of the teachings of the present invention may impart modifications thereto. Such modifications are to be construed as lying within the scope of the present invention, as defined by the appended claims.

What is claimed is:

1. A method of forming a collapsible field director structure from a blank comprising:
   a sheet of nonconductive material having at least three panels thereon, one of the panels being a master panel and the other two panels being first and second slave panels, the master panel and each slave panel having a front surface and a rear surface, the master panel and both slave panels each having at least two spaced-apart conductive regions thereon, each panel being substantially rectangular in shape and having elongated edges, each panel being connected to at least one adjacent panel along an elongated edge, the master panel having a line of articulation formed thereon, the line of articulation extending generally parallel to the upper edge thereof and subdividing the master panel into a mounting flange portion and a remainder portion, the remainder portion having a fold line formed thereon, the fold line subdividing the remainder portion into a spacer section and a conductor section, the method comprising the steps of:
a) folding the spacer and the conductor sections with respect to each other to dispose surfaces of these sections in confronting facial relationship;
b) adhering the confronting surfaces of the spacer and the conductor sections to each other thereby to define a double-thickness conductor flap having a front and a rear surface;
c) folding the double-thickness conductor flap and the first slave panel with respect to each other to dispose the front surface of the conductor flap in confronting facial adjacency to the rear surface of said first slave panel;
d) folding the double-thickness conductor flap of the master panel and the other slave panel with respect to each other to dispose the rear surface of the conductor flap and the rear surface of said other slave panel in confronting facial adjacency;
e) adhering the front surface of the conductor flap to the rear surface of said one slave panel; and
f) adhering the rear surface of the conductor flap to the rear surface of said other slave panel.

2. The method of claim 1 further comprising the step of:
g) attaching the mounting flange to a planar support element.

3. A method of forming a susceptor assembly having a collapsible field director structure from a blank comprising:
a sheet of nonconductive material having at least three panels thereon, one of the panels being a master panel and the other two panels being first and second slave panels, the master panel and each slave panel having a front surface and a rear surface, the master panel and both slave panels each having at least two spaced-apart conductive regions thereon, each panel being substantially rectangular in shape and having elongated edges, each panel being connected to at least one adjacent panel along an elongated edge, the master panel having a line of articulation formed thereon, the line of articulation extending generally parallel to the upper edge thereof and subdividing the master panel into a mounting flange portion and a remainder portion, the remainder portion having a fold line formed thereon, the fold line subdividing the remainder portion into a spacer section and a conductor section, the method comprising the steps of:
a) folding the spacer and the conductor sections with respect to each other to dispose surfaces of these sections in confronting facial relationship;
b) adhering the confronting surfaces of the spacer section and the conductor sections to each other thereby to define a double-thickness conductor flap having a front and a rear surface;
c) folding the double-thickness conductor flap and the first slave panel with respect to each other to dispose the front surface of the conductor flap in confronting facial adjacency to the rear surface of said first slave panel;
d) folding the double-thickness conductor flap of the conductor flap and the other slave panel with respect to each other to dispose the rear surface of the master panel and the rear surface of said other slave panel in confronting facial adjacency;
e) adhering the front surface of the conductor flap to the rear surface of said one slave panel;
f) adhering the rear surface of the conductor flap to the rear surface of said other slave panel; and
g) attaching the mounting flange to a planar susceptor.

* * * * *